US012447496B2

(12) United States Patent
Chen et al.

(10) Patent No.: US 12,447,496 B2
(45) Date of Patent: Oct. 21, 2025

(54) AUTOMATIC GLUE SPREADING DEVICE FOR HEAT CONDUCTING PLATE

(71) Applicant: Guangdong Lyric Robot Automation Co., Ltd., Huizhou (CN)

(72) Inventors: Junxing Chen, Huizhou (CN); Wenbo Zhou, Huizhou (CN); Shaopeng Luo, Huizhou (CN); Xiaotao Xu, Huizhou (CN); Wujie Wu, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 0 days.

(21) Appl. No.: 17/919,289

(22) PCT Filed: Sep. 1, 2022

(86) PCT No.: PCT/CN2022/116568

§ 371 (c)(1),
(2) Date: Oct. 17, 2022

(87) PCT Pub. No.: WO2023/051154

PCT Pub. Date: Apr. 6, 2023

(65) Prior Publication Data

US 2024/0293839 A1 Sep. 5, 2024

(30) Foreign Application Priority Data

Sep. 29, 2021 (CN) .......................... 202111154925.8

(51) Int. Cl.
*B05C 11/02* (2006.01)
*B05C 13/02* (2006.01)

(52) U.S. Cl.
CPC ............ *B05C 11/023* (2013.01); *B05C 13/02* (2013.01)

(58) Field of Classification Search
None
See application file for complete search history.

(56) References Cited

U.S. PATENT DOCUMENTS

| | | | | |
|---|---|---|---|---|
| 3,044,442 A * | 7/1962 | Cyrus | B05C 11/023 | 118/259 |
| 6,601,629 B2 * | 8/2003 | Toyoda | B29C 41/02 | 118/100 |
| 7,381,273 B2 * | 6/2008 | Collins | B05C 3/09 | 118/423 |
| 7,472,803 B2 * | 1/2009 | Kalra | B65H 3/24 | 221/256 |

(Continued)

FOREIGN PATENT DOCUMENTS

| | | |
|---|---|---|
| CN | 207887485 U | 9/2018 |
| CN | 208600064 U | 3/2019 |

(Continued)

OTHER PUBLICATIONS

First Office Action from Chinese Application No. 202111154925.8 dated Mar. 22, 2022, 5 pages.

(Continued)

*Primary Examiner* — Jethro M. Pence
(74) *Attorney, Agent, or Firm* — Daylight Law, P.C.

(57) ABSTRACT

An automatic glue spreading device for a heat conducting plate includes a heat conducting plate feeding module configured for feeding the heat conducting plate; a heat conducting plate glue spreading module configured for spreading glue on the heat conducting plate; a heat conducting plate clamping and conveying module configured for clamping and conveying the heat conducting plate from the heat conducting plate feeding module to the heat conducting plate glue spreading module; and a heat conducting plate detection mechanism configured for detecting the heat conducting plate before glue spreading.

16 Claims, 6 Drawing Sheets

(56) References Cited

U.S. PATENT DOCUMENTS

| | | | | |
|---|---|---|---|---|
| 8,887,894 | B2 * | 11/2014 | Lu | B65G 47/902 198/463.3 |
| 9,216,868 | B1 * | 12/2015 | Li | B65H 3/063 |
| 9,434,497 | B2 * | 9/2016 | Li | B32B 43/006 |
| 11,633,876 | B2 * | 4/2023 | Li | B24D 18/0009 425/220 |
| 2003/0183165 | A1 * | 10/2003 | Kakimoto | H01L 21/6715 118/100 |
| 2006/0191952 | A1 | 8/2006 | Kalra et al. | |
| 2021/0062057 | A1 * | 3/2021 | Li | B28B 13/028 |

FOREIGN PATENT DOCUMENTS

| | | | | |
|---|---|---|---|---|
| CN | 209476601 | U * | 10/2019 | B05C 13/02 |
| CN | 211099890 | U | 7/2020 | |
| CN | 211359425 | U | 8/2020 | |
| CN | 212093034 | U | 12/2020 | |
| CN | 212639185 | U | 3/2021 | |
| CN | 113680608 | B | 11/2022 | |

OTHER PUBLICATIONS

International Search Report from International Application No. PCT/CN2022/116568 dated Nov. 30, 2022, 5 pages.

Second Office Action from Chinese Application No. 202111154925.8 dated Jul. 20, 2022, 6 pages.

Supplementary Search from Chinese Application No. 202111154925.8 dated Sep. 8, 2022, 2 pages.

Written Opinion of the International Application from the International Application No. PCT/CN2022/116558 dated Nov. 30, 2022, 5 pages.

* cited by examiner

AUTOMATIC GLUE SPREADING DEVICE FOR HEAT CONDUCTING PLATE

CROSS-REFERENCE TO RELATED APPLICATIONS

This application is a national stage filing under 35 U.S.C. § 371 of international application number PCT/CN2022/116568, filed Sep. 1, 2022, which claims priority to Chinese patent application No. 2021111549258 filed Sep. 29, 2021. The contents of these applications are incorporated herein by reference in their entirety.

TECHNICAL FIELD

The disclosure relates to the field of glue spreading technologies, and particularly to an automatic glue spreading device for a heat conducting plate.

BACKGROUND

Heat conducting plate is an important component of a lithium battery. In the assembly and production of the lithium battery, it is necessary to spread glue on two faces of the heat conducting plate, and then assemble and stack battery cells with the heat conducting plate to form a battery module.

However, there are many problems in an existing battery module assembly and production line, such as glue spreading on the heat conducting plate, in which a manual feeding single machine is generally used in operation, with high labor cost, low production efficiency, unstable product quality, poor production flexibility and functional integration, thus being unable to meet existing production needs.

SUMMARY

An embodiment of the disclosure provides an automatic glue spreading device for a heat conducting plate, which has a strong structural integration and a high glue spreading efficiency, effectively reduces production cost, and improves production efficiency and production quality.

An embodiment of the disclosure provides an automatic glue spreading device for a heat conducting plate, which includes a heat conducting plate feeding module configured for feeding the heat conducting plate; a heat conducting plate glue spreading module configured for spreading glue on the heat conducting plate; a heat conducting plate clamping and conveying module configured for clamping and conveying the heat conducting plate from the heat conducting plate feeding module to the heat conducting plate glue spreading module; and a heat conducting plate detection mechanism arranged in a stroke range of the heat conducting plate clamping and conveying module and configured for detecting the heat conducting plate before glue spreading.

In the above technical solution, the heat conducting plate feeding module is arranged for automatic feeding of the heat conducting plate. In battery assembly production, there is a large demand of the heat conducting plate, and manual feeding is used with a low efficiency, which cannot meet production rate requirement, thus affecting production efficiency of the whole line. The arrangement of the heat conducting plate feeding module can greatly improve feeding efficiency of the heat conducting plate, and avoid influence of manual operation on quality of the heat conducting plate due to non-standard operation technique. The heat conducting plate feeding module is in butt joint with the heat conducting plate glue spreading module, so that glue spreading efficiency of the heat conducting plate can be effectively improved. The heat conducting plate detection mechanism is arranged, so that the heat conducting plate can be detected before glue spreading, so as to remove no-good products, further improve a yield of glue spreading production, avoid glue spreading on the no-good products to make the no-good products of the heat conducting plate lose a rework opportunity to be completely scrapped, and avoid glue waste at the same time, thus effectively reducing product rejection rate and saving material cost. The whole automatic glue spreading device for a heat conducting plate is high in integrity, high in automation degree and suitable for large-scale production requirements of a battery production line.

In some embodiments, the heat conducting plate feeding module includes a mounting stand; a storage rack arranged on the mounting stand and configured for stacking and storing the heat conducting plates along a vertical direction; a discharging assembly arranged at a lower end of the storage rack, wherein the discharging assembly is configured to control the heat conducting plates in the storage rack to be sequentially discharged from a bottom portion of the storage rack at intervals; a receiving assembly arranged below the mounting stand, wherein the receiving assembly is configured to receive the heat conducting plates discharged from the bottom portion of the storage rack; and a heat conducting plate pushing module configured for being in butt joint with the receiving assembly and conveying the heat conducting plates on the receiving assembly to a taking point of the heat conducting plate clamping and conveying module.

In the above technical solution, the storage rack is arranged on the mounting stand, the discharging assembly and the receiving assembly are arranged below the storage rack cooperatively, and the whole heat conducting plate feeding module discharges from a bottom portion, so that the heat conducting plates can be stacked in the storage rack, and directly discharged from the bottom portion of the storage rack by means of self-gravity, and cooperatively with the discharging assembly, the heat conducting plates can be controlled to be discharged one by one, and the heat conducting plates discharged through the storage rack are received by the receiving assembly, so that the heat conducting plates are separated, and then pushed to a required station through the heat conducting plate pushing module. The whole heat conducting plate feeding module has a simple structure, an ingenious design, a stable separation effect, a low requirement for feeding accuracy of the heat conducting plate, a convenient operation, an effectively saved cost on device and a strong practicability.

In some embodiments, the storage rack includes two limiting frames, the two limiting frames are arranged on the mounting stand and defines a limiting cavity of the heat conducting plate between the two limiting frames. The storage rack is composed of the limiting frames, and the limiting cavity formed between the two limiting frames plays a limiting and guiding role on the heat conducting plates, so as to ensure that the stacked heat conducting plates stably and accurately move to the bottom portion under an action of gravity. The structure is simple and practical.

In some embodiments, the discharging assembly includes two supporting claws horizontally and slidably arranged on two opposite sides of the bottom portion of the storage rack towards each other; and a telescopic driving member arranged at the bottom portion of the storage rack, wherein the telescopic driving member is configured to drive the two supporting claws to move towards each other to stretch or move away from each other to retract; wherein, when the two supporting claws move away from each other to retract, the heat conducting plate located at a lowest end in the storage rack is discharged from the bottom portion of the storage rack; and when the two supporting claws move towards each other to stretch, the heat conducting plate is prevented from being continuously discharged from the bottom portion of the storage rack.

In the above technical solution, the discharging assembly is an oppositely arranged openable supporting claw structure, the two supporting claws are synchronously controlled to retract, so that the heat conducting plate located at the lowest end of the storage rack may be discharged, and the two supporting claws are controlled to stretch, so that the heat conducting plate above the supporting claws is prevented from falling continuously, so as to discharge the heat conducting plates from the bottom portion of the storage rack at intervals.

In some embodiments, the receiving assembly includes a first lifting driving mechanism; a receiving plate arranged at an execution end of the first lifting driving mechanism to lift under the drive of the first lifting driving mechanism, wherein the receiving plate is configured for receiving the heat conducting plate; at least two positioning blocks symmetrically arranged on left and right sides of the receiving plate; two first clamping members slidably arranged on front and back sides of the receiving plate towards each other; and a first clamping driving member arranged on the receiving plate, wherein the first clamping driving member is configured to drive the two first clamping members to move towards each other to clamp or move away from each other to open.

In the above technical solution, two limiting mechanisms of the positioning block and the first clamping member cooperate with each other, and when the heat conducting plate falls on the receiving plate, the positioning blocks preliminarily limit the heat conducting plate so as to avoid the heat conducting plate from falling from two sides of the receiving plate, and correct a direction of the heat conducting plate on the receiving plate so as to avoid rotation deviation of the heat conducting plate. Then the heat conducting plate is clamped centripetally by the first clamping members, and on one hand, the heat conducting plate is completely positioned on the receiving plate, so as to avoid the heat conducting plate from being separated from the receiving plate by an abnormal force, on the other hand, the positioning blocks and the first clamping members cooperate with each other to correct a position of the heat conducting plate on the receiving plate, which facilitates taking by the heat conducting plate pushing module. The first lifting driving mechanism is arranged to drive the receiving plate to lift, so as to drive the receiving plate to ascend close to the lower end of the storage rack during receiving, and drive the receiving plate to descend for a certain distance after receiving, thus avoiding interference with the storage rack during taking by the heat conducting plate pushing module, facilitating cooperation with the heat conducting plate pushing module, and simplifying a taking structure of the heat conducting plate pushing module.

In some embodiments, the storage rack includes a plurality of storage racks arranged side by side on the mounting stand, and the automatic glue spreading device for a heat conducting plate further includes a first linear driving mechanism horizontally arranged below the mounting stand, wherein the receiving assembly is arranged at an execution end of the linear driving mechanism to be able to reciprocate under the drive of the linear driving mechanism, so as to be in butt joint with the plurality of storage racks respectively.

In the above technical solution, the plurality of storage racks are arranged side by side on the mounting stand to store the heat conducting plates, so that on one hand, feeding frequency of the heat conducting plate feeding module can be effectively reduced, and automatic performance of the heat conducting plate feeding module itself can be improved; and on the other hand, heat conducting plates with different specifications may be stored in the plurality of storage racks, so as to facilitate flexible conversion according to adjustment of production line products, and avoid frequent replacement of the heat conducting plates in the storage racks, thus having a strong flexibility and universality. The receiving assembly is driven to move by the first linear driving mechanism, so that the same receiving assembly can correspond to different storage racks, the receiving assembly moves to a position below a target storage rack during taking, then the target storage rack discharges, and the receiving assembly receives a target heat conducting plate and then transports the target heat conducting plate to the heat conducting plate pushing module, so that on one hand, the moving receiving assembly is in flexible butt joint with the plurality of storage racks and the heat conducting plate pushing module, which effectively saves device cost and device space compared with a structure that each storage rack is provided with one receiving assembly and one heat conducting plate pushing module; and on the other hand, it can be ensured that the heat conducting plates of the plurality of storage racks are all transported out through the same heat conducting plate pushing module, which ensures the same discharging position, and facilitates taking by the heat conducting plate clamping and conveying module.

In some embodiments, the heat conducting plate pushing module includes a second linear driving mechanism, wherein a driving end of the second linear driving mechanism extends from a position below the mounting stand to a taking position of the heat conducting plate clamping and conveying module; a conveying stand arranged at an execution end of the second linear driving mechanism; two second clamping members vertically and slidably arranged on the conveying stand towards each other and configured for clamping upper and lower surfaces of the heat conducting plate; and a second clamping driving member arranged on the conveying stand, wherein the second clamping driving member is configured to drive the two second clamping members to move towards each other to clamp or move away from each other to open.

In the above technical solution, the second clamping members clamping vertically are arranged on the conveying stand, the heat conducting plate is laid flat on the receiving assembly, and the receiving assembly transports the heat conducting plate to the heat conducting plate pushing module after receiving the heat conducting plate, so that the heat conducting plate is located between two opened second clamping members, and the second clamping members vertically clamp the upper and lower surfaces of the heat conducting plate to take the heat conducting plate from the receiving assembly, and the second clamping members have a structure for clamping upper and lower surfaces, which not only ensures stable clamping to the heat conducting plate, but also facilitates taking by the heat conducting plate clamping and conveying module.

In some embodiments, the heat conducting plate clamping and conveying module includes a portal frame bridged between the heat conducting plate feeding module and the heat conducting plate glue spreading module; a third linear driving mechanism horizontally arranged on the portal frame along a length extension direction of the portal frame; a second lifting driving mechanism arranged at an execution end of the third linear driving mechanism; and a clamping gripper arranged at an execution end of the lifting driving mechanism, wherein the clamping gripper is configured to clamp the heat conducting plate.

In some embodiments, the heat conducting plate detection mechanism includes a CCD camera.

In the above technical solution, the heat conducting plate clamping assembly moves the heat conducting plate to a detection end of the CCD camera after taking the heat conducting plate, and the CCD camera detects the heat conducting plate to remove no-good products of the heat conducting plates before glue spreading. The CCD camera has a wide range of uses and a strong flexibility, and may flexibly adjust detection contents according to different detection requirements, thus having a stronger applicability.

In some embodiments, the heat conducting plate glue spreading module includes a machining stand; a placement and positioning mechanism arranged on the machining stand and configured for bearing the heat conducting plate conveyed by the heat conducting plate clamping and conveying module and positioning the heat conducting plate; a turnover driving mechanism connected to the placement and positioning mechanism, wherein the turnover driving mechanism is configured to drive the placement and positioning mechanism to turn over, so that the heat conducting plate on the placement and positioning mechanism is turned over; and a glue spreading mechanism configured for spreading glue on the heat conducting plate on the placement and positioning mechanism.

In the above technical solution, the placement and positioning mechanism is arranged on the machining stand for positioning the heat conducting plate, and the turnover driving mechanism is arranged on the placement and positioning mechanism to drive the heat conducting plate to directly turn over on the placement and positioning mechanism, so that the glue spreading mechanism directly spread glue on two surfaces of the heat conducting plate on the placement and positioning mechanism, thus having a strong structural integration and a high degree of glue spreading automation.

In some embodiments, the heat conducting plate glue spreading module further includes a fourth linear driving mechanism horizontally arranged on the machining stand, wherein the placement and positioning mechanism is arranged at an execution end of the fourth linear driving mechanism to horizontally reciprocate under the drive of the fourth linear driving mechanism.

In the above technical solution, the fourth linear driving mechanism is arranged to make the placement and positioning mechanism move on the machining stand, so that on one hand, the placement and positioning mechanisms can be pushed to a discharging position after glue spreading, which facilitates automatic connection with a subsequent station, and has a high flexibility; and on the other hand, the fourth linear driving mechanism is arranged to facilitate flexible movement of the heat conducting plate on the placement and positioning mechanism, so as to uniformly spread glue on a surface of the heat conducting plate cooperatively with the glue spreading mechanism, thus effectively simplifying a structure of the glue spreading mechanism.

In some embodiments, the glue spreading mechanism includes a mounting frame erected above the fourth linear driving mechanism; a fifth linear driving mechanism horizontally arranged on the mounting frame, wherein a driving direction of the fifth linear driving mechanism is perpendicular to a driving direction of the fourth linear driving mechanism; a third lifting driving mechanism arranged at an execution end of the fifth linear driving mechanism; and a glue spreading head arranged at a driving end of the third lifting driving mechanism to be able to lift under the drive of the third lifting driving mechanism.

In the above technical solution, the glue spreading mechanism has a simple structure, and cooperates with the fourth linear driving mechanism to spread glue on the heat conducting plate, the fifth linear driving mechanism drives the glue spreading machine to move gradually along an X-axis direction, and the fourth linear driving mechanism drives the placement and positioning mechanism to reciprocate along a Y-axis direction during glue spreading, so that the combination of the two mechanisms realizes uniform glue spreading on the surface of the heat conducting plate, thus effectively improving glue spreading speed and glue spreading uniformity, improving utilization of device components, and effectively simplifying the whole device structure and saving cost.

In some embodiments, a plurality of placement and positioning mechanisms and a plurality of fourth linear driving mechanisms are arranged side by side, and every two placement and positioning mechanisms are arranged at an execution end of the same fourth linear driving mechanism.

The plurality of fourth linear driving mechanisms are arranged on the placement stand to facilitate mutual replacement of taking, glue spreading and placing, thus further optimizing production rate, reducing waiting time of device, and further improving production efficiency while improving device utilization rate. Two placement and positioning mechanisms are arranged on each fourth linear driving mechanism to realize a synchronous double-station glue spreading function, which means that two heat conducting plates are spread with glue at the same time, thus further improving utilization rate of the driving mechanism and production efficiency.

In some embodiments, the placement and positioning mechanism includes a base plate; two brackets arranged on two opposite sides of the base plate; a placement plate connected between the two brackets, wherein the placement plate is configured for supporting two ends of the heat conducting plate along the length direction; and two clamping assemblies respectively arranged on the two brackets and configured for clamping and positioning the heat conducting plate placed on the placement plate.

In some embodiments, the clamping assembly includes two third clamping members slidably arranged on the bracket towards each other along a width direction of the heat conducting plate; and a third clamping driving member arranged on the bracket, wherein the third clamping driving member is configured to drive the two third clamping members to move towards each other to clamp or move away from each other to open.

In the above technical solution, the two third clamping members clamp two sides of the heat conducting plate along the width direction of the heat conducting plate, which not only ensures that the heat conducting plate will not fall from the placement plate during turning over, but also avoids the third clamping members from interfering with the glue spreading surface of the heat conducting plate.

In some embodiments, the turnover driving mechanism includes two supporting seats arranged on two opposite sides of the base plate, wherein each of the two brackets is rotatably arranged on a respective one of the two supporting seats; and a rotation driving member arranged on one of the supporting seats, wherein the rotation driving member is configured to drive the bracket to rotate.

In the above technical solution, the two brackets are rotatably arranged on the supporting seats, the rotation driving member is arranged on one of the brackets, so that when the rotation driving member drives one bracket to rotate, the whole heat conducting plate can be driven to turn over, thus having a simple structure and a stable function. The two brackets are arranged at two ends of the heat conducting plate along the length direction, which facilitates turnover of the heat conducting plate along a central line of the length direction, avoids interfering with the placement stand when the heat conducting plate is turned over, and avoids increasing a height of the whole glue spreading module.

In some embodiments, the automatic glue spreading device for a heat conducting plate further includes a manual supplementing station arranged in the stroke range of the heat conducting plate clamping and conveying module, wherein the manual supplementing station is configured for placing a heat conducting plate qualified in rework, so that the heat conducting plate clamping and conveying module clamps and conveys the heat conducting plate qualified in rework to the heat conducting plate glue spreading module for glue spreading.

In the above technical solution, the manual supplementing station is arranged to facilitate manual supplementation of a NG product qualified in rework.

BRIEF DESCRIPTION OF THE DRAWINGS

In order to illustrate the technical solutions of the embodiments of the disclosure more clearly, the drawings which need to be used in the embodiments will be briefly introduced hereinafter. It is to be understood that the following drawings only show some embodiments of the disclosure, so that the drawings should not be regarded as limiting the scope. Those of ordinary skills in the art may further obtain other related drawings according to these drawings without going through any creative work.

REFERENCE NUMERALS

Figure 1:
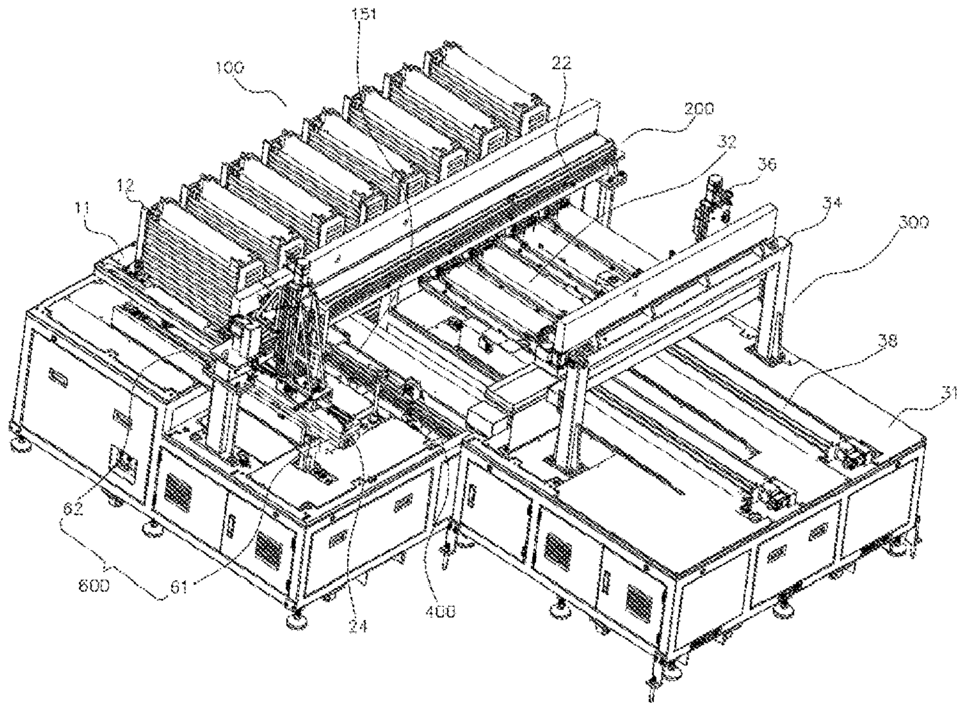
FIG. 1 is a schematic diagram of an overall structure of an automatic glue spreading device for a heat conducting plate according to some embodiments of the disclosure.

100 refers to heat conducting plate feeding module;

11 refers to mounting stand; 12 refers to storage rack; 121 refers to limiting frame; 1211 refers to limiting bar; 13 refers to discharging assembly; 131 refers to telescopic driving member; 132 refers to supporting claw; 14 refers to receiving assembly; 141 refers to receiving plate; 142 refers to positioning block; 143 refers to cushion block; 144 refers to first clamping member; 145 refers to first clamping driving member; 146 refers to receiving frame; 147 refers to first lifting driving mechanism; 148 refers to receiving supporting stand; 15 refers to heat conducting plate pushing module; 151 refers to second linear driving mechanism; 152 refers to conveying stand; 153 refers to second clamping member; 1531 refers to clamping block; 154 refers to second clamping driving member; 155 refers to guide slide rail;

200 refers to heat conducting plate clamping and conveying module;

21 refers to portal frame; 22 refers to third linear driving mechanism; 23 refers to second lifting driving mechanism; 24 refers to clamping gripper; 241 refers to bidirectional cylinder of clamping jaw; 242 refers to clamping jaw;

300 refers to heat conducting plate glue spreading module;

31 refers to machining stand; 32 refers to placement and positioning mechanism; 321 refers to base plate; 322 refers to bracket; 323 refers to placement plate; 324 refers to clamping assembly; 3241 refers to third clamping member; 3242 refers to third clamping driving member; 33 refers to turnover driving mechanism; 331 refers to supporting seat; 332 refers to rotation driving member; 34 refers to mounting frame; 35 refers to fifth linear driving mechanism; 36 refers to third lifting driving mechanism; 37 refers to glue spreading head; 38 refers to fourth linear driving mechanism;

400 refers to heat conducting plate detection mechanism;

500 refers to first linear driving mechanism;

600 refers to manual supplementing station; 61 refers to supplementing plate; and 62 refers to supplementing driving mechanism.

DETAILED DESCRIPTION

In order to make the objects, technical solutions, and advantages of the embodiments of the disclosure clearer, the technical solutions in the embodiments of the disclosure will be described clearly and completely hereinafter with reference to the drawings in the embodiments of the disclosure. Obviously, the described embodiments are some, but not all, embodiments of the disclosure. Generally, the assemblies in the embodiments of the disclosure described and illustrated in the drawings herein may be arranged and designed in various different configurations.

Therefore, the following detailed descriptions of the embodiments of the disclosure provided in the drawings are not intended to limit the scope of the disclosure sought to be protected, but only represent the selected embodiments of the disclosure. Based on the embodiments in the disclosure, all other embodiments obtained by those of ordinary skills in the art without going through any creative work should fall within the scope of protection of the disclosure.

It should be noted that: similar reference numerals and letters indicate similar items in the following drawings, so once one item is defined in one drawing, it does not need to be further defined and explained in the following drawings.

In the description of the disclosure, it should be noted that if the orientation or position relationship indicated by the terms “inner”, “outer”, and the like is based on the orientation or position relationship shown in the accompanying drawings, or the orientation or position relationship of the product of the disclosure in use, it is only for the convenience of description of the disclosure and simplification of the description, and it is not to indicate or imply that the indicated device or element must have a specific orientation, and be constructed and operated in a specific orientation. Therefore, the terms should not be understood as limiting the disclosure. In addition, the terms “first”, “second” and the like are used for distinguishing description only and cannot be understood as indicating or implying relative importance.

In the description of the disclosure, it should also be noted that the terms “arrangement” and “connection” should be understood in a broad sense unless otherwise clearly specified and defined. For example, they may be fixed connection, removable connection or integrated connection; may be mechanical connection or electrical connection; and may be direct connection, or indirect connection through an intermediate medium, and connection inside two elements. The specific meanings of the above terms in the disclosure can be understood in a specific case by those of ordinary skills in the art.

In the existing battery production process, a heat conducting plate needs to be assembled between battery cells in battery assembly, and the heat conducting plate needs to be glued on two faces before assembly.

The heat conducting plate is a thin panel, and is in great demand in battery assembly. In the existing production process, the heat conducting plate is mostly glued manually with a glue spreading mechanism, and then the glue spreading mechanism is in butt joint with a subsequent assembly device, which means that the heat conducting plate is manually placed on a glue spreading station, the glue spreading station is provided with a positioning mechanism to position the heat conducting plate for glue spreading, and the heat conducting plate is transported to an assembly station after glue spreading.

The inventor finds that the production mode of glue spreading by a manual feeding single station not only wastes manpower, but also has a low glue spreading efficiency, a mismatched production rate and long waiting time of man-machine. In addition, it is inconvenient to spread glue on the two faces of the heat conducting plate directly in a glue spreading stage, and a conversion jig is needed for transfer, thus having a redundant structure and a long glue spreading cycle.

In view of this, an embodiment of the disclosure provides an automatic glue spreading device for a heat conducting plate, which includes a heat conducting plate feeding module 100 configured for feeding the heat conducting plate; a heat conducting plate glue spreading module 300 configured for spreading glue on the heat conducting plate; a heat conducting plate clamping and conveying module 200 configured for clamping and conveying the heat conducting plate from the heat conducting plate feeding module 100 to the heat conducting plate glue spreading module; and a heat conducting plate detection mechanism 400 arranged in a stroke range of the heat conducting plate clamping and conveying module 200 and configured for detecting the heat conducting plate before glue spreading.

With reference to FIG. 1, in some embodiments, the heat conducting plate feeding module 100 may include a mounting stand 11; a storage rack 12 arranged on the mounting stand 11 and configured for stacking and storing the heat conducting plates along a vertical direction; a discharging assembly 13 arranged at a lower end of the storage rack 12, wherein the discharging assembly 13 is configured to control the heat conducting plates in the storage rack 12 to be sequentially discharged from a bottom portion of the storage rack 12 at intervals; a receiving assembly 14 arranged below the mounting stand 11, wherein the receiving assembly 14 is configured to receive the heat conducting plates discharged from the bottom portion of the storage rack 12; and a heat conducting plate pushing module 15 configured for being in butt joint with the receiving assembly 14 and conveying the heat conducting plates on the receiving assembly 14 to a taking point of the heat conducting plate clamping and conveying module 200.

The storage rack 12 is arranged on the mounting stand 11, the discharging assembly 13 and the receiving assembly 14 are arranged below the storage rack 12 cooperatively, and the whole heat conducting plate feeding module 100 discharges from a bottom portion, so that the heat conducting plates may be stacked in the storage rack 12, and directly discharged from the bottom portion of the storage rack 12 by means of self-gravity. Cooperatively with the discharging assembly 13, the heat conducting plates may be controlled to be discharged one by one, and the heat conducting plates discharged through the storage rack 12 are received by the receiving assembly 14, so that the heat conducting plates are separated, and then pushed to a required station through the heat conducting plate pushing module 15. The whole heat conducting plate feeding module 100 has a simple structure, an ingenious design, a stable separation effect, a low requirement for feeding accuracy of the heat conducting plate, a convenient operation, an effectively saved cost on device and a strong practicability.

It can be understood that the storage rack 12 has a storage cavity with an opening at a lower end, and the storage cavity is configured for limiting displacements of the heat conducting plates along front, back, left and right directions, so as to ensure that the heat conducting plates always have a tendency force to vertically move towards the opening at the lower end of the storage cavity under an action of the self-gravity. Shapes of the storage rack 12 and the storage cavity may be adjusted according to shape and size of the heat conducting plates in actual production, so as to limit the stacked heat conducting plates.

In some embodiments, taking a rectangular heat conducting plate as an example, the storage rack 12 includes two limiting frames 121, the two limiting frames 121 are arranged on the mounting stand 11 and define a limiting cavity of the heat conducting plate between the two limiting frames 121.

Figure 2:
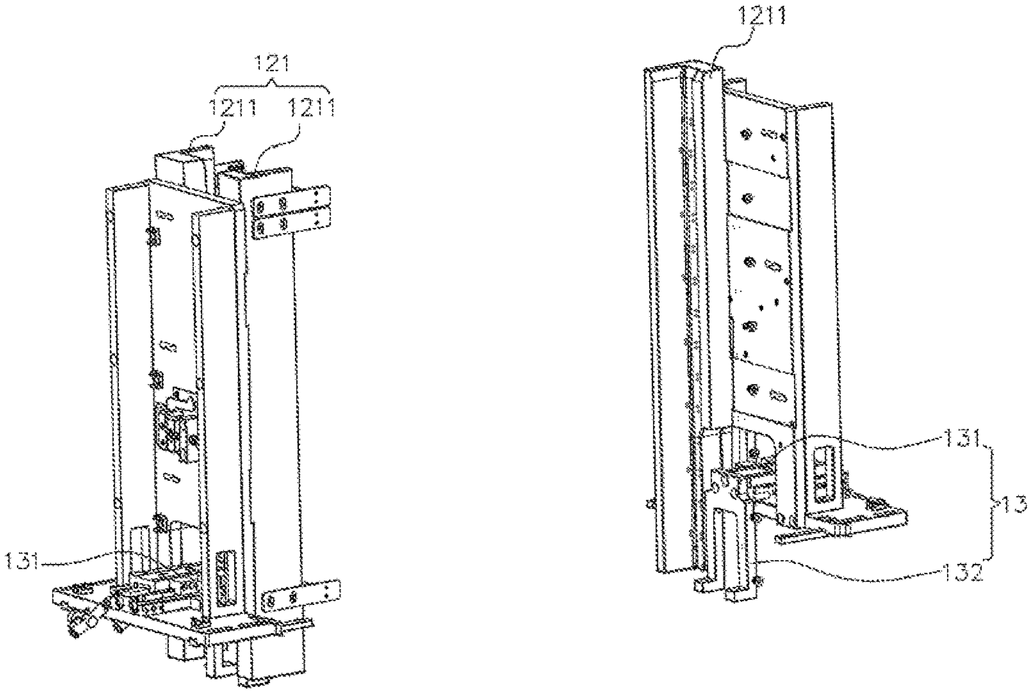
FIG. 2 is a schematic structural diagram of a storage rack according to some embodiments of the disclosure.

With reference to FIG. 2, the storage rack 12 may include two mounting plates vertically arranged on the mounting stand 11, and each mounting plate is provided with two limiting bars 1211 with an L-shaped cross section towards each other. The two L-shaped limiting bars 1211 are connected to form one limiting frame 121, a heat conducting plate limiting cavity is formed between the two limiting frames 121, and the stacked heat conducting plates are put into the limiting cavity formed between the two limiting frames 121.

In some embodiments, the discharging assembly 13 may include two supporting claws 132 horizontally and slidably arranged on two opposite sides of the bottom portion of the storage rack 12 towards each other; and a telescopic driving member 131 arranged at the bottom portion of the storage rack 12, wherein the telescopic driving member 131 is configured to drive the two supporting claws 132 to move towards each other to stretch or move away from each other to retract. When the two supporting claws 132 move away from each other to retract, the heat conducting plate located at a lowest end in the storage rack 12 is discharged from the bottom portion of the storage rack 12; and when the two supporting claws 132 move towards each other to stretch, the heat conducting plate is prevented from being continuously discharged from the bottom portion of the storage rack 12.

With reference to FIG. 2, optionally, the supporting claw 132 may be provided with a vertical portion and a horizontal portion, the horizontal portion is arranged at a lower end of the vertical portion, and the horizontal portions of the two supporting claws 132 are arranged towards each other. When the two supporting claws 132 stretch horizontally, vertical faces of the two supporting claws 132 are attached to outer sides of the stacked heat conducting plates, and horizontal faces of the two supporting claws 132 stretch to lower faces of the heat conducting plates to support the heat conducting plates on the supporting claws 132.

The telescopic driving member 131 may be a bidirectional cylinder, a bidirectional screw or other driving members. Optionally, the telescopic driving member 131 includes two unidirectional cylinders of the supporting claws 132, the two unidirectional cylinders of the supporting claws 132 are mounted on left and right sides at the lower end of the storage rack 12, execution ends of the two cylinders of the supporting claws 132 are arranged towards each other, and each of the two supporting claws 132 are mounted on a respective one of the two cylinders of the supporting claws 132. The two supporting claws 132 are synchronously controlled to retract through the two cylinders of the supporting claws 132, so that the heat conducting plate located at the lowest end of the storage rack 12 can be discharged, and the two supporting claws 132 are controlled to stretch, so that the heat conducting plate above the supporting claws 132 is prevented from falling continuously, so as to discharge the heat conducting plates from the bottom portion of the storage rack 12 at intervals.

In some embodiments, the receiving assembly 14 includes a first lifting driving mechanism 147; a receiving plate 141 arranged at an execution end of the first lifting driving mechanism 147 to lift under the drive of the first lifting driving mechanism 147, wherein the receiving plate 141 is configured for receiving the heat conducting plate; at least two positioning blocks 142 symmetrically arranged on left and right sides of the receiving plate 141; two first clamping members 144 slidably arranged on front and back sides of the receiving plate 141 towards each other; and a first clamping driving member 145 arranged on the receiving plate 141, wherein the first clamping driving member 145 is configured to drive the two first clamping members 144 to move towards each other to clamp or move away from each other to open.

Figure 3:
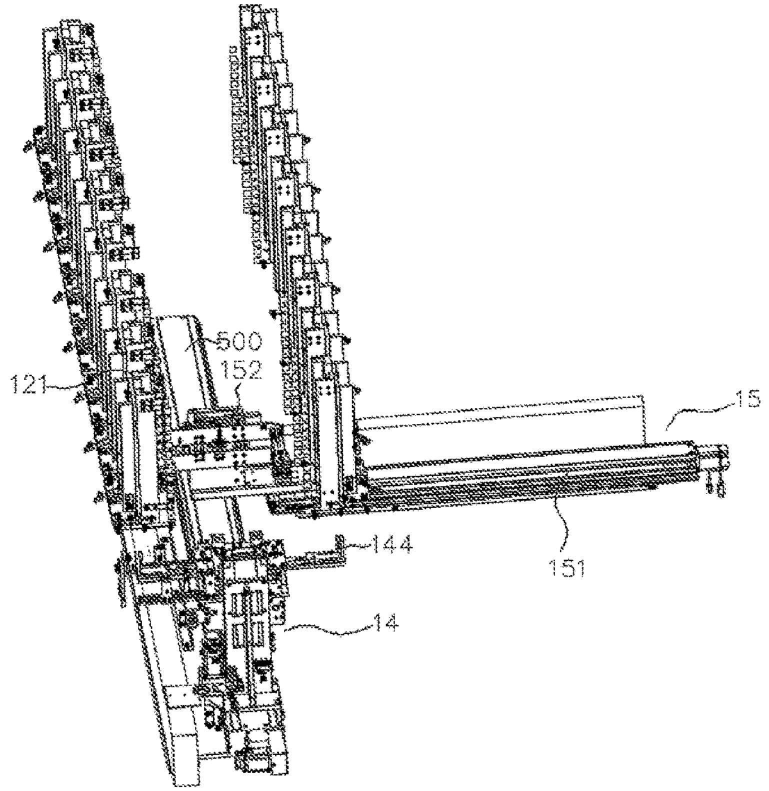
FIG. 3 is a schematic diagram of a matching structure for a receiving assembly and a heat conducting plate pushing module according to some embodiments of the disclosure.
Figure 4:
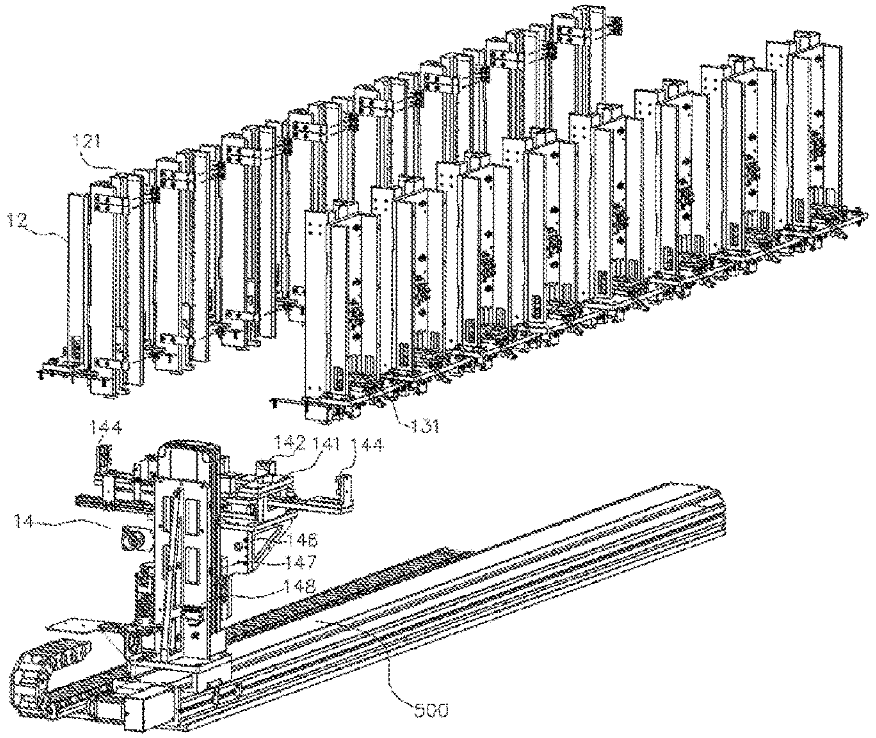
FIG. 4 is a first schematic structural diagram of the receiving assembly according to some embodiments of the disclosure.
Figure 5:
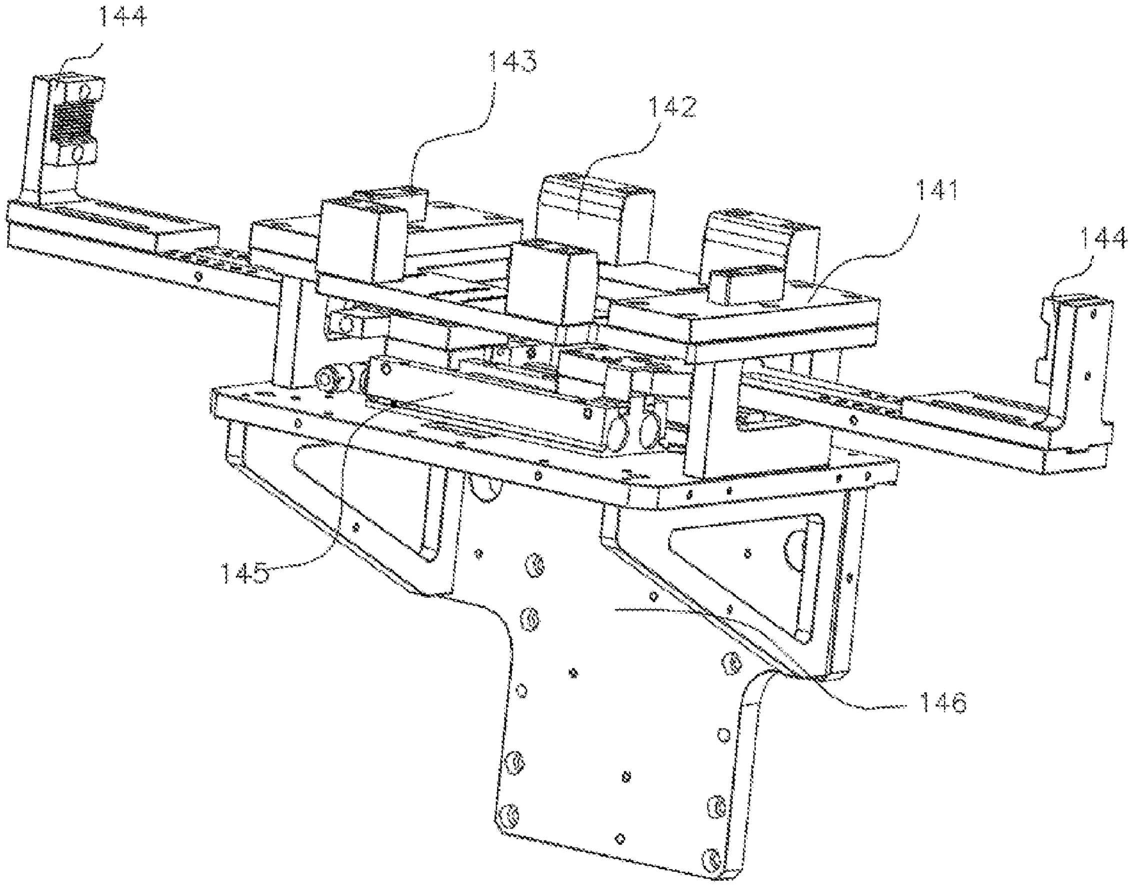
FIG. 5 is a second schematic structural diagram of the receiving assembly according to some embodiments of the disclosure.

With reference to FIG. 3 to FIG. 5, the receiving plate 141 is mounted on a receiving frame 146, the two positioning blocks 142 are respectively arranged on left and right sides of the receiving plate 141, and front and rear sides of the receiving plate 141 are slidably provided with one first clamping member 144 respectively. The first clamping driving member 145 may be a bidirectional cylinder, the bidirectional cylinder is mounted on the receiving frame 146 and located at a bottom portion of the receiving plate 141, the two first clamping members 144 are respectively mounted at two driving ends of the bidirectional cylinder, and the bidirectional cylinder drives the two first clamping members 144 to clamp two ends of the heat conducting plate along a length direction.

The positioning blocks 142 may be made of a flexible material such as rubber to avoid scratching the heat conducting plate, downwardly inclined planes may be arranged on one sides of the positioning blocks 142 close to a center of the receiving plate 141 to guide the falling heat conducting plate. Alternatively, cushion blocks 143 may be arranged on front and rear sides of the receiving plate 141. The cushion blocks 143 may be made of a flexible block such as a rubber block, and the heat conducting plate falls on the cushion blocks 143 to further avoid scratching the heat conducting plate. Similarly, rubber pads may be arranged on acting faces of the two first clamping members 144.

A bottom portion of the receiving frame 146 is provided with the first lifting driving mechanism 147, and the first lifting driving mechanism 147 may be a vertically arranged screw or a vertically arranged single-axis manipulator. As shown in the drawings, the first lifting driving mechanism 147 includes a receiving supporting stand 148, the vertically arranged single-axis manipulator is mounted on the receiving supporting stand 148, and the receiving frame 146 is mounted at an execution end of the single-axis manipulator.

The first lifting driving mechanism 147 drives the receiving plate 141 to lift, so as to drive the receiving plate 141 to ascend close to a lower end of the storage rack 12 during receiving, thus reducing the falling height. The first lifting driving mechanism 147 drives the receiving plate 141 to descend for a certain distance after receiving, so as to avoid interference with the storage rack 12 during taking by the heat conducting plate pushing module 15, facilitate cooperation with the heat conducting plate pushing module 15, and simplify the taking structure of the heat conducting plate pushing module 15.

As shown in FIG. 1 and FIG. 3, in some embodiments, a plurality of storage racks 12 may be provided, and the plurality of storage racks 12 are arranged side by side on the mounting stand 11. The automatic glue spreading device for a heat conducting plate further includes: a first linear driving mechanism 500 horizontally arranged below the mounting stand 11, wherein the receiving assembly 14 is arranged at an execution end of the linear driving mechanism to be able to reciprocate under the drive of the linear driving mechanism, so as to be in butt joint with the plurality of storage racks 12 respectively.

The plurality of storage racks 12 may be mounted side by side on the mounting stand 11, and the plurality of storage racks 12 may be configured for storing the same type of heat conducting plates to provide a plurality of feeding positions, so as to avoid waiting for taking. Alternatively, the plurality of storage racks 12 may be configured for storing different types of heat conducting plates to facilitate flexible machining of different types of heat conducting plates.

The first linear driving mechanism 500 is arranged at a bottom portion of the receiving assembly 14 below the mounting stand 11, wherein the receiving supporting stand 148 is mounted at the execution end of the first linear driving mechanism 500, and the receiving assembly 14 is driven to move by the first linear driving mechanism 500, so that the same receiving assembly 14 can correspond to different storage racks 12. The receiving assembly 14 moves to a position below a target storage rack 12 during taking, then the target storage rack 12 discharges, and the receiving assembly 14 receives a target heat conducting plate and then transports the target heat conducting plate to the heat conducting plate pushing module 15. On one hand, the moving receiving assembly 14 is in flexible butt joint with the plurality of storage racks 12 and the heat conducting plate pushing module 15, which effectively saves a device cost and a device space compared with a structure that each storage rack 12 is provided with one receiving assembly 14 and one heat conducting plate pushing module 15. On the other hand, it can be ensured that the heat conducting plates of the plurality of storage racks 12 are all transported out through the same heat conducting plate pushing module 15, which ensures the same discharging position, and facilitates taking by the heat conducting plate clamping and conveying module 200.

It can be understood that the first linear driving mechanism 500 may be a moving shaft or other linear driving mechanisms according to actual stroke requirement.

Figure 6:
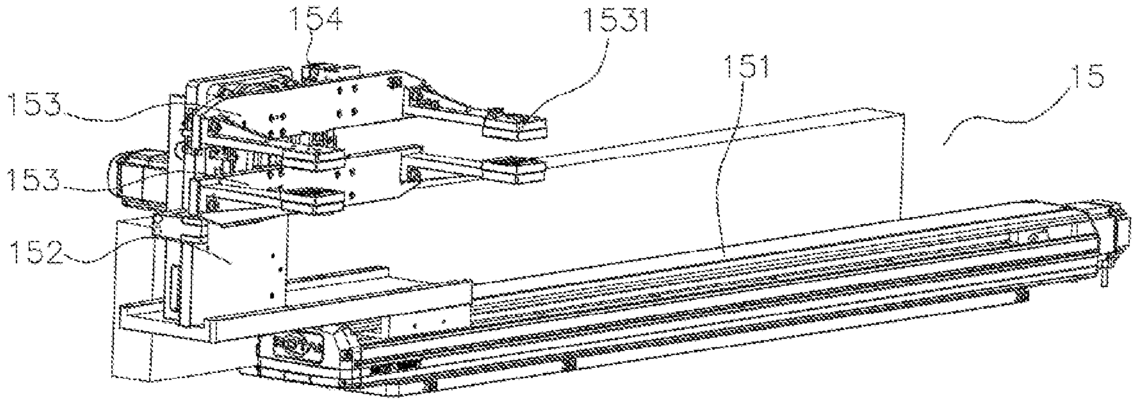
FIG. 6 is a schematic structural diagram of the heat conducting plate pushing module according to some embodiments of the disclosure.
Figure 7:
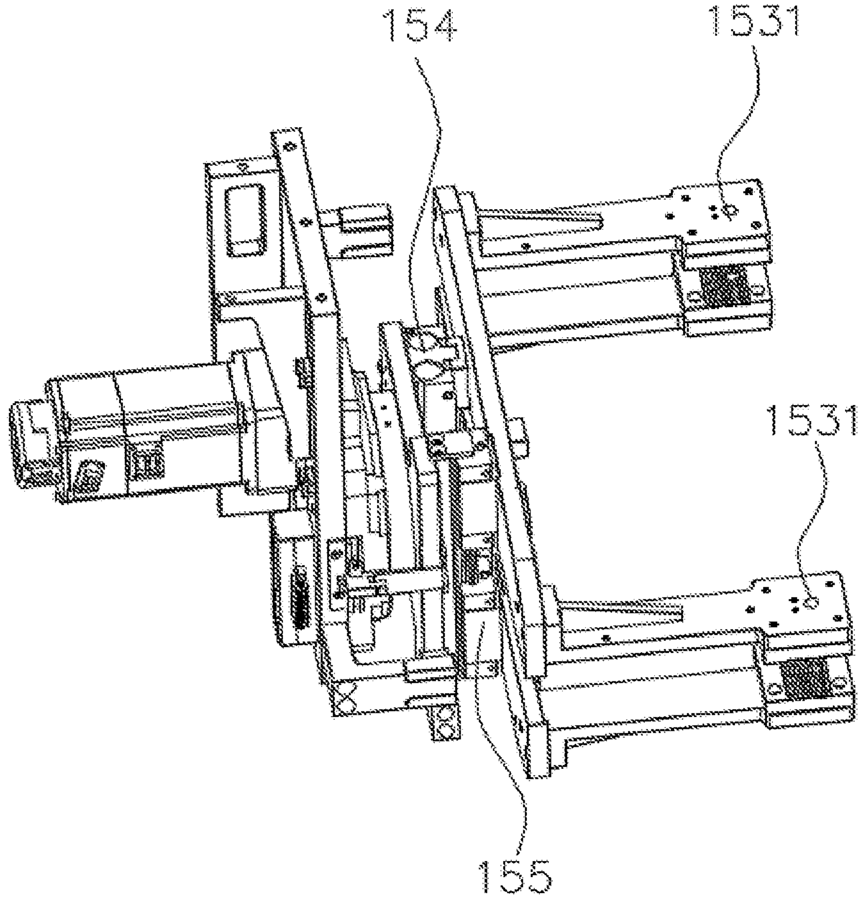
FIG. 7 is a schematic structural diagram of a second clamping member of the heat conducting plate pushing module according to some embodiments of the disclosure.

As shown in FIG. 6 and FIG. 7, as an optional embodiment, the heat conducting plate pushing module 15 includes a second linear driving mechanism 151, wherein a driving end of the second linear driving mechanism 151 extends from a position below the mounting stand 11 to a taking position of the heat conducting plate clamping and conveying module 200; a conveying stand 152 arranged at an execution end of the second linear driving mechanism 151; two second clamping members 153 vertically and slidably arranged on the conveying stand 152 towards each other and configured for clamping upper and lower surfaces of the heat conducting plate; and a second clamping driving member 154 arranged on the conveying stand 152, wherein the second clamping driving member 154 is configured to drive the two second clamping members 153 to move towards each other to clamp or move away from each other to open.

The second linear driving mechanism 151 may be perpendicular to a transportation direction of the first linear driving mechanism 500, each second clamping member 153 includes two clamping blocks 1531 stretching horizontally, and the four clamping blocks 1531 correspond to each other up and down in pairs, so as to increase a clamping area of the heat conducting plate. Certainly, clamping acting faces of the second clamping members 153 may be set according to actual requirement based on a size of the heat conducting plate. Certainly, a rubber pad or other flexible pads may be arranged on an acting face of the clamping block 1531.

The second clamping driving member 154 may be a bidirectional cylinder, and the two second clamping members 153 are connected to two execution ends of the bidirectional cylinder respectively. In order to ensure stability of reciprocation of the two second clamping members 153, a guide rail 155 may be mounted on the conveying stand 152, and the two second clamping members 153 are slidably arranged on the guide rail 155 to guide the two second clamping members 153.

After taking the heat conducting plate, the receiving assembly 14 clamps, positions and transports the heat conducting plate to the heat conducting plate pushing module 15, so that the heat conducting plate is located between two opened second clamping members 153. The second clamping members 153 vertically clamp the upper and lower surfaces of the heat conducting plate, and then the first clamping members 144 of the receiving plate 141 are released to not position the heat conducting plate. The receiving assembly 14 withdraws from an operating track of the heat conducting plate pushing module 15 under a joint action of the first lifting driving mechanism 147 and the first linear driving mechanism 500, and then the heat conducting plate is conveyed from the receiving assembly 14 to the heat conducting plate pushing module 15. The second clamping members 153 of the heat conducting plate pushing module 15 have a structure for clamping upper and lower surfaces, and the receiving assembly 14 has a structure for clamping side edges, so that the heat conducting plate is directly conveyed in the two clamping manners without interfering with each other.

In some embodiments, the heat conducting plate clamping and conveying module 200 includes a portal frame 21, wherein one end of the portal frame is arranged on the heat conducting plate feeding module 100, and the other end of the portal frame is arranged on the heat conducting plate glue spreading module 300; a third linear driving mechanism 22 horizontally arranged on the portal frame 21 along a length extension direction of the portal frame 21; a second lifting driving mechanism 23 arranged at an execution end of the third linear driving mechanism 22; and a clamping gripper 24 arranged at an execution end of the lifting driving mechanism, wherein the clamping gripper 24 is configured to clamp the heat conducting plate.

Figure 8:
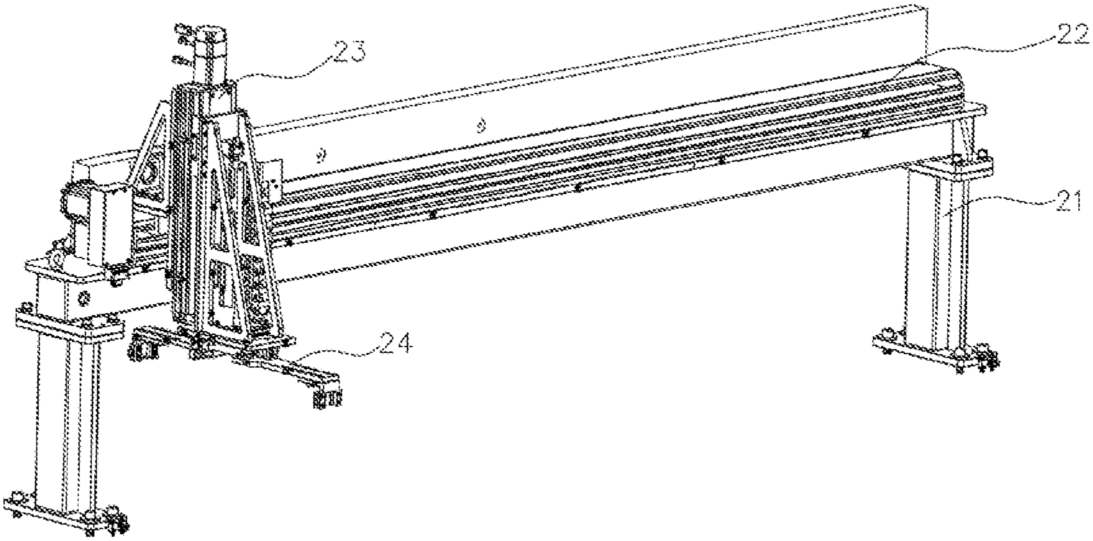
FIG. 8 is a schematic structural diagram of a heat conducting plate clamping and conveying module according to some embodiments of the disclosure.

As shown in FIG. 8, the extension direction of the portal frame 21 is parallel to a conveying direction of the first linear driving mechanism 500, which means that the portal frame is arranged along the side-by-side arrangement direction of the plurality of storage racks 12. The third linear driving mechanism 22 is mounted on the portal frame 21, and a tail end of the second linear driving mechanism 151 extends from a position below the mounting stand 11 to a proximal end of the third linear driving mechanism 22. The heat conducting plate pushing module 15 clamps the heat conducting plate and transports the heat conducting plate to a position below the portal frame 21, the third linear driving mechanism 22 drives the clamping gripper 24 to move to a position just above the heat conducting plate, and the second lifting driving mechanism 23 drives the clamping gripper 24 to move downwardly. The clamping gripper 24 clamps the heat conducting plate on the heat conducting plate clamping and conveying module 200, and then the heat conducting plate clamping and conveying module 200 releases the clamping to the heat conducting plate, and resets. The third linear driving mechanism 22 and the second lifting driving mechanism 23 drive the clamping gripper 24 clamping the heat conducting plate to move continuously.

Figure 9:
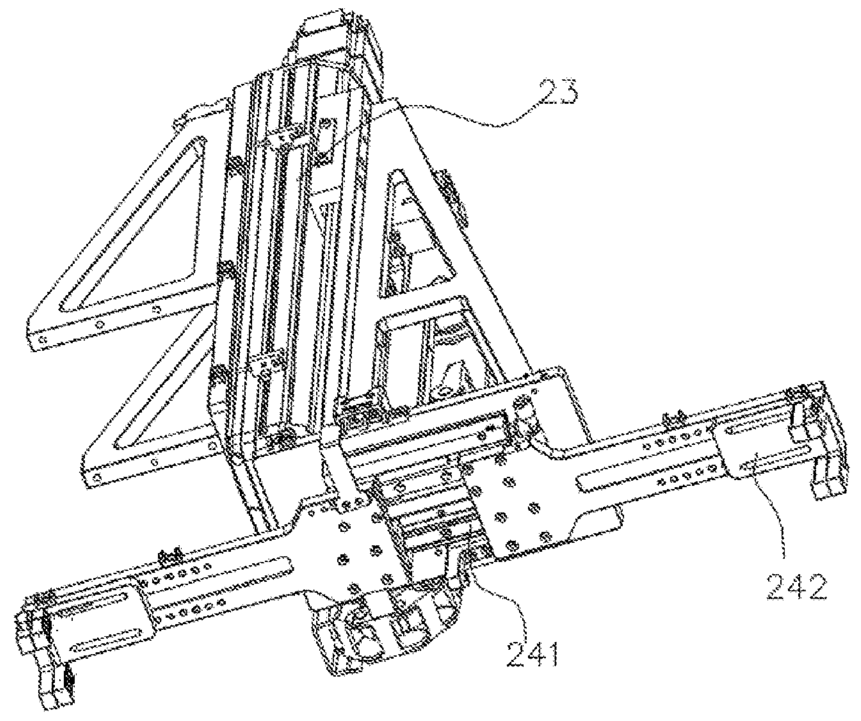
FIG. 9 is a schematic structural diagram of a clamping jaw of the heat conducting plate clamping and conveying module according to some embodiments of the disclosure.

As shown in FIG. 9, the clamping gripper 24 has the structure for clamping the side edges of the heat conducting plate, and includes two clamping jaws 242 slidably arranged towards each other. The two clamping jaws 242 slidably arranged towards each other are driven to clamp by bidirectional cylinders 241 of the clamping jaws, and flexible pads may be arranged on execution faces of the two clamping jaws 242.

The second clamping members 153 of the heat conducting plate pushing module 15 clamp the upper and lower surfaces of the heat conducting plate and horizontally transport out the heat conducting plate, and the clamping gripper 24 clamps opposite side edges of the heat conducting plate to directly take the heat conducting plate from the heat conducting plate pushing module 15, so that the two clamping mechanisms do not interfere with each other.

It can be understood that the clamping gripper 24 moves downwardly and clamps the heat conducting plate on two sides. In order not to interfere with the second clamping member 153 on the upper surface of the heat conducting plate, the clamping gripper 24 needs to be horizontally displaced by a certain distance under the drive of the third linear driving mechanism 22 after clamping the heat conducting plate, so that the heat conducting plate is separated from an upper and lower clamping range of the second clamping members 153, and then the clamping gripper 24 is driven to ascend or descend by the second lifting driving mechanism 23 to avoid the operation of the clamping gripper 24 from interfering with the second clamping members 153.

The second linear driving mechanism 151, the third linear driving mechanism 22 and the second lifting driving mechanism 23 may all be a single-axis manipulator or a screw or other linear driving mechanisms.

In some embodiments, the heat conducting plate detection mechanism 400 includes a CCD camera (charge coupled device).

As shown in FIG. 1, the CCD camera may be mounted beside the taking position of the heat conducting plate clamping and conveying module 200, and after the heat conducting plate clamping and conveying module 200 takes the heat conducting plate, the clamping gripper 24 is directly driven to move to a position above the CCD camera, so that the heat conducting plate is aligned with the CCD for detection.

It can be understood that a NG product placement stand may be arranged within the stroke range of the heat conducting plate clamping and conveying module 200, and a heat conducting plate detected as unqualified is directly placed on the NG product placement stand by the heat conducting plate clamping and conveying module 200 for manual re-inspection or rework, while the heat conducting plate clamping and conveying module 200 takes a new heat conducting plate for detection, and a heat conducting plate detected as qualified is continuously conveyed to the glue spreading module.

In some embodiments, the automatic glue spreading device for a heat conducting plate further includes a manual supplementing station 600 arranged in the stroke range of the heat conducting plate clamping and conveying module 200, wherein the manual supplementing station 600 is configured for placing a heat conducting plate qualified in rework, and the heat conducting plate clamping and conveying module 200 clamps and conveys the heat conducting plate qualified in rework to the heat conducting plate glue spreading module 300 for glue spreading.

As shown in FIG. 1, the manual supplementing station 600 is arranged on the mounting stand 11 side by side with the plurality of storage racks 12, and the manual supplementing station 600 includes a supplementing plate 61 and a supplementation driving mechanism 62 driving the supplementing plate 61 to move linearly. After a heat conducting plate detected to be NG is taken from the NG product placement stand for re-inspection or rework, the heat conducting plate qualified in rework is placed on the supplementing plate 61, the supplementation driving mechanism 62 drives the supplementing plate 61 to move to the heat conducting plate clamping and conveying module 200, and the heat conducting plate clamping and conveying module 200 clamps the heat conducting plate qualified in rework from the supplementing plate 61 and conveys the heat conducting plate qualified in rework to the heat conducting plate glue spreading module.

In the above technical solution, the manual supplementing station 600 is arranged to facilitate manual supplementation of the NG product qualified in rework.

In some embodiments, the heat conducting plate glue spreading module 300 includes a machining stand 31; a placement and positioning mechanism 32 arranged on the machining stand 31 and configured for bearing the heat conducting plate conveyed by the heat conducting plate clamping and conveying module 200 and positioning the heat conducting plate; a turnover driving mechanism 33 connected to the placement and positioning mechanism 32, wherein the turnover driving mechanism 33 is configured to drive the placement and positioning mechanism 32 to turn over, so that the heat conducting plate on the placement and positioning mechanism 32 is turned over; and a glue spreading mechanism configured for spreading glue on the heat conducting plate on the placement and positioning mechanism 32.

As shown in FIG. 1, the machining stand 31 is in butt joint with the mounting stand 11, the third linear driving mechanism 22 extends from the heat conducting plate pushing module 15 to the machining stand 31, and a placement and positioning direction of the placement and positioning mechanism 32 is consistent with a placement direction of the heat conducting plate on the storage rack 12, so that the device has a compact overall structure, which voids adjustment of the feeding direction of the heat conducting plate, and saves time for taking and placing while simplifies the structure.

In some embodiments, the heat conducting plate glue spreading module 300 further includes a fourth linear driving mechanism 28 horizontally arranged on the machining stand 31, wherein the placement and positioning mechanism 32 is arranged at an execution end of the fourth linear driving mechanism 38 to horizontally reciprocate under the drive of the fourth linear driving mechanism 38.

Optionally, a plurality of placement and positioning mechanisms 32 and a plurality of fourth linear driving mechanisms 38 are arranged side by side, and every two placement and positioning mechanisms 32 are arranged at an execution end of the same fourth linear driving mechanism 38.

As shown in FIG. 1, two fourth linear driving mechanisms 38 are arranged side by side on the machining stand 31, and two placement and positioning mechanisms 32 are arranged side by side at the execution end of each fourth linear driving mechanism.

On one hand, the fourth linear driving mechanisms 38 are arranged, so that the placement and positioning mechanisms 32 is movable on the machining stand 31, and the placement and positioning mechanisms 32 may be pushed to far ends of the fourth linear driving mechanisms 38 for discharging after glue spreading, which facilitates automatic connection with a subsequent station, and has a high flexibility. On the other hand, the fourth linear driving mechanisms 38 are arranged to facilitate flexible movement of the heat conducting plates on the placement and positioning mechanisms 32, so as to uniformly spread glue on surfaces of the heat conducting plates cooperatively with the glue spreading mechanism, thus effectively simplifying structure of the glue spreading mechanism. Two fourth linear driving mechanisms 38 are arranged on the placement stand to facilitate mutual replacement of placing, glue spreading and discharging of the heat conducting plate, thus further optimizing the production rate, reducing waiting time of the glue spreading machine, and further improving production efficiency while improving device utilization rate.

Figure 10:
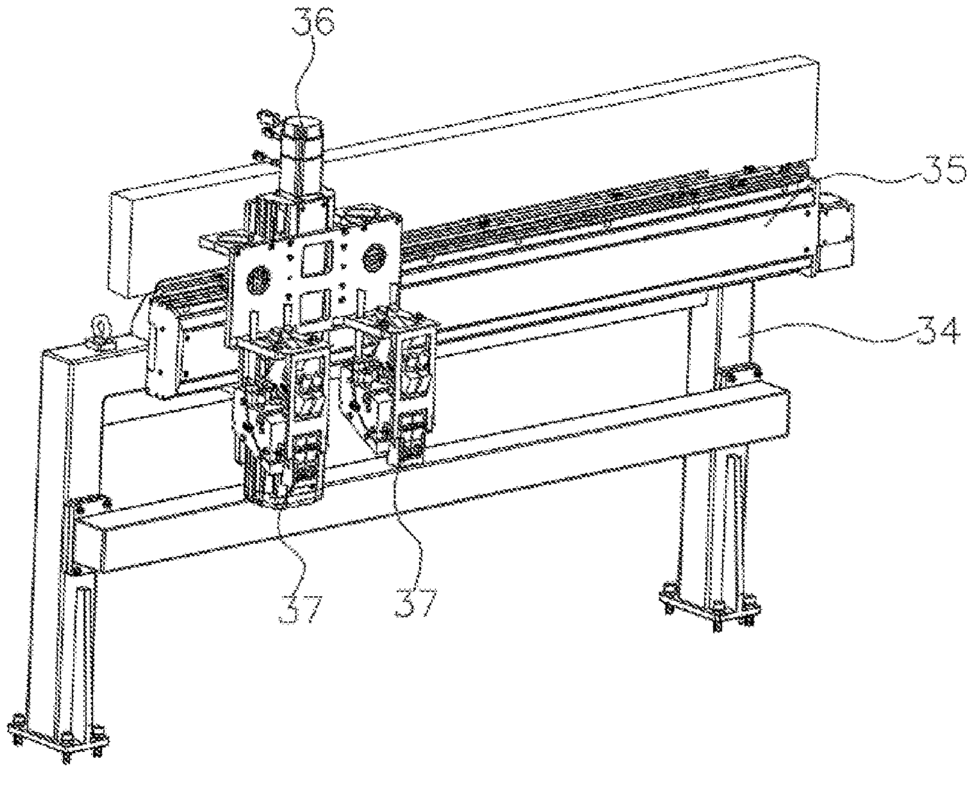
FIG. 10 is a schematic structural diagram of a heat conducting plate glue spreading module according to some embodiments of the disclosure.

As shown in FIG. 10, as an optional embodiment, the glue spreading mechanism includes a mounting frame 34 erected above the two fourth linear driving mechanisms 38; a fifth linear driving mechanism 35 horizontally arranged on the mounting frame 34, wherein a driving direction of the fifth linear driving mechanism 35 is perpendicular to a driving direction of the fourth linear driving mechanism 38; a third lifting driving mechanism 36 arranged at an execution end of the fifth linear driving mechanism 35; and a glue spreading head 37 arranged at a driving end of the third lifting driving mechanism 36 to be able to lift under the drive of the third lifting driving mechanism 36.

It can be understood that when each fourth linear driving mechanism 38 is provided with two placement and positioning mechanisms 32, an execution end of the third lifting driving mechanism 36 may be provided with two glue spreading heads 37 side by side, so as to spread glue on two heat conducting plates synchronously.

The fourth linear driving mechanism 38 and the fifth linear driving mechanism 35 are matched with each other during glue spreading, the fifth linear driving mechanism 35 drives the glue spreading machine to move gradually along an X-axis direction (which is namely a width direction of the heat conducting plate), and the fourth linear driving mechanism 38 drives the placement and positioning mechanism 32 to reciprocate along a Y-axis direction (which is namely a length direction of the heat conducting plate), so that the glue spreading head 37 uniformly spreads glue on the heat conducting plate, thus effectively improving glue spreading speed and glue spreading uniformity, improving utilization of device components, and simplifying the whole device structure and saving cost.

It can be understood that the glue spreading mechanism may also be other mechanisms to realize a function of spreading glue on the heat conducting plate on the placement and positioning mechanism 32, for example, a three-axis manipulator or a multi-axis manipulator may be used to drive the glue spreading head 37 to spread glue on the heat conducting plate.

In some embodiments, the placement and positioning mechanism 32 includes a base plate 321; two brackets 322 arranged on the base plate 321 and located at two ends of the heat conducting plate along a length direction; a placement plate 323 connected between the two brackets 322, wherein the placement plate 323 is configured for supporting the heat conducting plate; and two clamping assemblies 324 respectively arranged on the two brackets 322 and configured for clamping and positioning the heat conducting plate placed on the placement plate 323.

Figure 11:
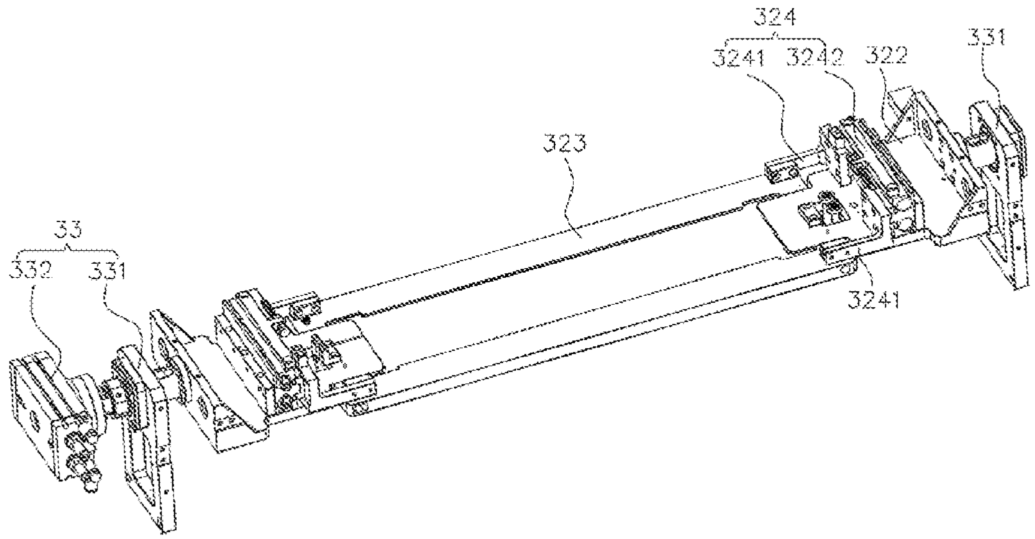
FIG. 11 is a first schematic structural diagram of a placement and positioning mechanism according to some embodiments of the disclosure.
Figure 12:
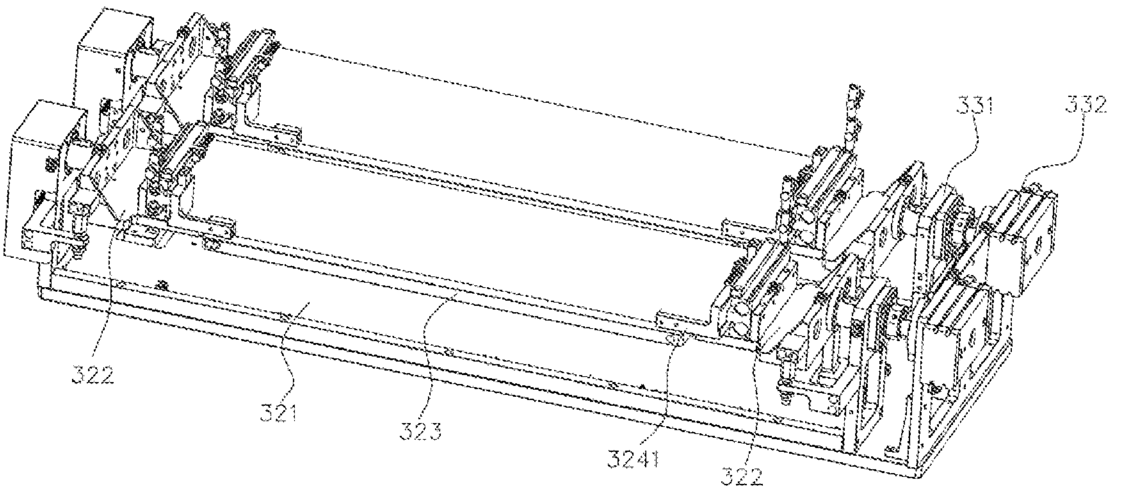
FIG. 12 is a second schematic structural diagram of the placement and positioning mechanism according to some embodiments of the disclosure.

As shown in FIG. 11 and FIG. 12, it can be understood that the placement plate 323 has a hollow-out surface, and when the heat conducting plate is placed on the placement plate 323, the placement plate 323 supports edges of the heat conducting plate, and reserves a glue spreading position on a surface of the heat conducting plate.

In some embodiments, the clamping assembly 324 includes two third clamping members 3241 slidably arranged on the bracket 322 towards each other along a width direction of the heat conducting plate; and a third clamping driving member 3242 arranged on the bracket 322, wherein the third clamping driving member 3242 is configured to drive the two third clamping members 3241 to move towards each other to clamp or move away from each other to open.

As shown in FIG. 11, a rubber pad or a flexible pad made of other materials may be arranged on an acting face of the first clamping member 144, the third clamping driving member 3242 may be a bidirectional cylinder, two third clamping members 3241 are mounted at two execution ends of the bidirectional cylinder respectively, and the two third clamping members 3241 clamp side surfaces of the heat conducting plate, which not only ensures that the heat conducting plate will not fall from the placement plate 323 during turning over, but also avoids the third clamping members 3241 from interfering with a glue spreading surface of the heat conducting plate.

As shown in FIG. 11, in some embodiments, the turnover driving mechanism 33 includes two supporting seats 331 arranged on two opposite sides of the base plate 321, wherein each of the two brackets 322 is rotatably arranged on a respective one of the two supporting seats 331; and a rotation driving member 332 arranged on one of the supporting seats 331, wherein the rotation driving member 332 is configured to drive the bracket 322 to rotate.

The rotation driving member 332 may be a rotating motor or a rotating cylinder, and the rotation driving member 332 drives the bracket 322 to rotate forward and backward, so as to drive the placement plate 323 to rotate, thus turning over the heat conducting plate. Moreover, the brackets 322 are arranged at two ends of the heat conducting plate along the length direction, and when the brackets 322 are driven to rotate, the heat conducting plate is turned over along a central line of the length direction, with a small turnover space requirement, so as to avoid interfering with the placement stand when the heat conducting plate is turned over, and avoid increasing a height of the whole glue spreading module.

It should be noted that the fourth linear driving mechanism 38, the fifth linear driving mechanism 35, and the third lifting driving mechanism 36 may all be a single-axis manipulator or a screw. The automatic glue spreading device for a heat conducting plate in the embodiments of the disclosure may be uniformly controlled by a controller, and the controller may be a PLC controller according to an actual demand.

Glue spreading by the automatic glue spreading device for a heat conducting plate in the embodiments of the disclosure mainly includes the following steps.

The heat conducting plates are manually stacked in the storage racks 12.

The receiving assembly 14 moves to a position below the target storage rack 12, and the receiving plate 141 is driven to ascend close to the bottom portion of the storage rack 12.

The two supporting claws 132 is driven to retract synchronously by the telescopic driving member 131 of the discharging assembly 13, so that the heat conducting plate at the lowest end of the storage rack 12 falls, and then the two supporting claws 132 are driven to stretch synchronously by the telescopic driving member 131, thus completing one discharge.

The heat conducting plate by the two first clamping members 144 of the receiving assembly 14, lowering the receiving plate 141 to separate from the bottom portion of the storage rack 12, and moving the receiving plate to the heat conducting plate pushing module 15.

The receiving assembly 14 clamps the heat conducting plate and move it close to the heat conducting plate pushing module 15, so that the heat conducting plate enters a clamping range of the two second clamping members 153, and the two second clamping members 153 clamp the heat conducting plate. The receiving assembly 14 releases the clamping on the heat conducting plate and move back.

The heat conducting plate pushing module 15 clamps the heat conducting plate to continue transporting, and the receiving assembly 14 may continuously move to the next storage rack 12 for receiving.

The heat conducting plate clamping and conveying module 200 clamps the heat conducting plate from the heat conducting plate pushing module 15, and transports the heat conducting plate to the placement and positioning mechanism 32 of the heat conducting plate glue spreading module.

The fourth linear driving mechanism 38 drives the placement and positioning mechanism 32 to move to the position below the glue spreading mechanism, the fifth linear driving mechanism 35 drives the glue spreading head 37 to move to the position just above the placement and positioning mechanism 32, the third lifting driving mechanism 36 drives the glue spreading head 37 to descend and contact with the heat conducting plate on the placement and positioning mechanism 32, and then glue is spread on the heat conducting plate through cooperation of the fourth linear driving mechanism 38 with the fifth linear driving mechanism 35.

The third lifting driving mechanism 36 drives the glue spreading head 37 to ascend.

The turnover driving mechanism 33 drives the heat conducting plate to turn over, the third lifting driving mechanism 36 drives the glue spreading head 37 to descend and contact with the heat conducting plate on the placement and positioning mechanism 32, and then glue is spread on an opposite surface of the heat conducting plate through cooperation of the fourth linear driving mechanism 38 with the fifth linear driving mechanism 35.

The fourth linear driving mechanism 38 drives the heat conducting plate with glue to move to the discharging position for discharging.

It should be noted that when a plurality of placement and positioning mechanisms 32 are arranged on the machining stand 31, the heat conducting plate clamping and conveying module 200 sequentially conveys the heat conducting plates to the plurality of placement and positioning mechanisms 32, and the glue spreading mechanism alternately spreads glue on the heat conducting plates on the plurality of placement and positioning mechanisms 32. The heat conducting plates with glue may be manually discharged, or directly linked with a downstream station for linked production.

It should be noted that, in the case of no conflict, the features in the embodiments in the disclosure may be combined with each other.

The above are only the preferred embodiments of the disclosure and not intended to limit the disclosure. For those of ordinary skills in the art, the disclosure may have various modifications and changes. Any modification, equivalent substitution and improvement made within the gist and principle of the disclosure are included in the scope of protection of the disclosure.

The invention claimed is:

1. An automatic glue spreading device for a heat conducting plate, comprising:

- a heat conducting plate feeding module configured for feeding the heat conducting plate;
- a heat conducting plate glue spreading module configured for spreading glue on the heat conducting plate;
- a heat conducting plate clamping and conveying module configured for clamping and conveying the heat conducting plate from the heat conducting plate feeding module to the heat conducting plate glue spreading module; and
- a heat conducting plate detection mechanism arranged in a stroke range of the heat conducting plate clamping and conveying module and configured for detecting the heat conducting plate before glue spreading;

wherein the heat conducting plate feeding module comprises:

- a mounting stand;
- a plurality of storage racks arranged side by side on the mounting stand, each of the plurality of storage racks configured for stacking and storing the heat conducting plate along a vertical direction;
- a receiving assembly arranged below the mounting stand, wherein the receiving assembly is configured to receive the heat conducting plate discharged from the bottom portion of the storage rack;
- a first linear driving mechanism horizontally arranged below the mounting stand, wherein the receiving assembly is arranged at an execution end of the first linear driving mechanism to be able to reciprocate under the drive of the first linear driving mechanism, so as to be in butt joint with the plurality of storage racks respectively; and
- a heat conducting plate pushing module configured for being in butt joint with the receiving assembly and conveying the heat conducting plate on the receiving assembly to a taking point of the heat conducting plate clamping and conveying module.

2. The automatic glue spreading device for a heat conducting plate of claim 1, wherein the heat conducting plate feeding module comprises:

- a discharging assembly arranged at a lower end of the storage rack, wherein the discharging assembly is configured to control the heat conducting plate in the storage rack to be sequentially discharged from a bottom portion of the storage rack at intervals.

3. The automatic glue spreading device for a heat conducting plate of claim 2, wherein the storage rack comprises two limiting frames, the two limiting frames are arranged on the mounting stand and define a limiting cavity of the heat conducting plate between the two limiting frames.

4. The automatic glue spreading device for a heat conducting plate of claim 2, wherein the discharging assembly comprises:

- two supporting claws horizontally and slidably arranged on two opposite sides of the bottom portion of the storage rack towards each other; and
- a telescopic driving member arranged at the bottom portion of the storage rack, wherein the telescopic driving member is configured to drive the two supporting claws to move towards each other to stretch or move away from each other to retract;

wherein, when the two supporting claws move away from each other to retract, the heat conducting plate located at a lowest end in the storage rack is discharged from the bottom portion of the storage rack; and when the two supporting claws move towards each other to stretch, the heat conducting plate is prevented from being continuously discharged from the bottom portion of the storage rack.

5. The automatic glue spreading device for a heat conducting plate of claim 2, wherein the receiving assembly comprises:

a first lifting driving mechanism;

a receiving plate arranged at an execution end of the first lifting driving mechanism to lift under the drive of the first lifting driving mechanism, wherein the receiving plate is configured for receiving the heat conducting plate;

at least two positioning blocks symmetrically arranged on left and right sides of the receiving plate;

two first clamping members slidably arranged on front and back sides of the receiving plate towards each other; and a first clamping driving member arranged on the receiving plate, wherein the first clamping driving member is configured to drive the two first clamping members to move towards each other to clamp or move away from each other to open.

6. The automatic glue spreading device for a heat conducting plate of claim 1, wherein the heat conducting plate pushing module comprises:

a second linear driving mechanism, wherein a driving end of the second linear driving mechanism extends from a position below the mounting stand to a taking position of the heat conducting plate clamping and conveying module;

a conveying stand arranged at an execution end of the second linear driving mechanism;

two second clamping members vertically and slidably arranged on the conveying stand towards each other and configured for clamping upper and lower surfaces of the heat conducting plate; and a second clamping driving member arranged on the conveying stand, wherein the second clamping driving member is configured to drive the two second clamping members to move towards each other to clamp or move away from each other to open.

7. The automatic glue spreading device for a heat conducting plate of claim 1, wherein the heat conducting plate clamping and conveying module comprises:

a portal frame, wherein one end of the portal frame is arranged on the heat conducting plate feeding module, and the other end of the portal frame is arranged on the heat conducting plate glue spreading module;

a third linear driving mechanism horizontally arranged on the portal frame along a length extension direction of the portal frame;

a second lifting driving mechanism arranged at an execution end of the third linear driving mechanism; and a clamping gripper arranged at an execution end of the second lifting driving mechanism, wherein the clamping gripper is configured to clamp the heat conducting plate.

8. The automatic glue spreading device for a heat conducting plate of claim 1, wherein the heat conducting plate detection mechanism comprises a CCD camera.

9. The automatic glue spreading device for a heat conducting plate of claim 1, wherein the heat conducting plate glue spreading module comprises:

a machining stand;

a placement and positioning mechanism arranged on the machining stand and configured for bearing the heat conducting plate conveyed by the heat conducting plate clamping and conveying module and positioning the heat conducting plate;

a turnover driving mechanism connected to the placement and positioning mechanism, wherein the turnover driving mechanism is configured to drive the placement and positioning mechanism to turn over, so that the heat conducting plate on the placement and positioning mechanism is turned over; and a glue spreading mechanism configured for spreading glue on the heat conducting plate on the placement and positioning mechanism.

10. The automatic glue spreading device for a heat conducting plate of claim 9, wherein the heat conducting plate glue spreading module comprises:

a fourth linear driving mechanism horizontally arranged on the machining stand, wherein the placement and positioning mechanism is arranged at an execution end of the fourth linear driving mechanism to horizontally reciprocate under the drive of the fourth linear driving mechanism.

11. The automatic glue spreading device for a heat conducting plate of claim 10, wherein the glue spreading mechanism comprises:

a mounting frame erected above the fourth linear driving mechanism;

a fifth linear driving mechanism horizontally arranged on the mounting frame, wherein a driving direction of the fifth linear driving mechanism is perpendicular to a driving direction of the fourth linear driving mechanism;

a third lifting driving mechanism arranged at an execution end of the fifth linear driving mechanism; and a glue spreading head arranged at a driving end of the third lifting driving mechanism to be able to lift under the drive of the third lifting driving mechanism.

12. The automatic glue spreading device for a heat conducting plate of claim 10, wherein the placement and positioning mechanism comprise a plurality of placement and positioning mechanisms arranged side by side and the fourth linear driving mechanism comprises a plurality of fourth linear driving mechanisms arranged side by side, and every two placement and positioning mechanisms are arranged at an execution end of an identical fourth linear driving mechanism.

13. The automatic glue spreading device for a heat conducting plate of claim 9, wherein the placement and positioning mechanism comprises:

a base plate;

two brackets arranged on the base plate and located at two ends of the heat conducting plate along a length direction;

a placement plate connected between the two brackets, wherein the placement plate is configured for supporting the heat conducting plate; and two clamping assemblies respectively arranged on the two brackets and configured for clamping and positioning the heat conducting plate placed on the placement plate.

14. The automatic glue spreading device for a heat conducting plate of claim 13, wherein the clamping assembly comprises:

two third clamping members slidably arranged on the brackets towards each other along a width direction of the heat conducting plate; and a third clamping driving member arranged on the brackets, wherein the third clamping driving member is configured to drive the two third clamping members to move towards each other to clamp or move away from each other to open.

15. The automatic glue spreading device for a heat conducting plate of claim 13, wherein the turnover driving mechanism comprises:

two supporting seats arranged on two opposite sides of the base plate, wherein each of the two brackets are rotatably arranged on a respective one of the two supporting seats; and a rotation driving member arranged on one of the supporting seats, wherein the rotation driving member is configured to drive the brackets to rotate.

16. The automatic glue spreading device for a heat conducting plate of claim 1, further comprising:

a manual supplementing station arranged in the stroke range of the heat conducting plate clamping and conveying module, wherein the manual supplementing station is configured for placing a heat conducting plate qualified in rework, so that the heat conducting plate clamping and conveying module clamps and conveys the heat conducting plate qualified in rework to the heat conducting plate glue spreading module for glue spreading.

* * * * *